R. FREULER.
COTTON CHOPPER.
APPLICATION FILED DEC. 14, 1912. RENEWED OCT. 21, 1913.

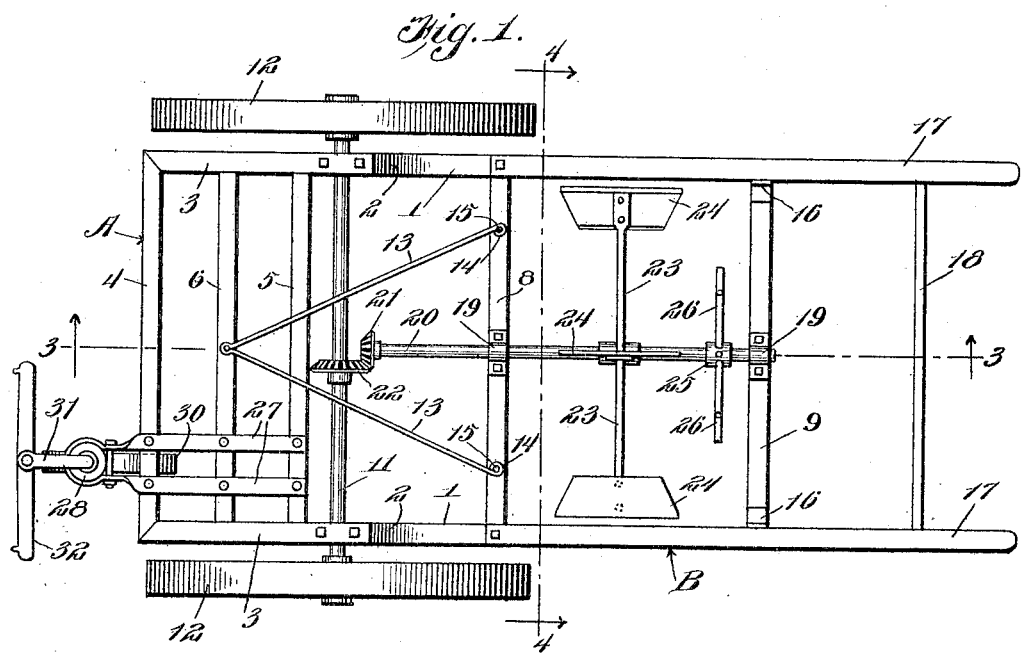
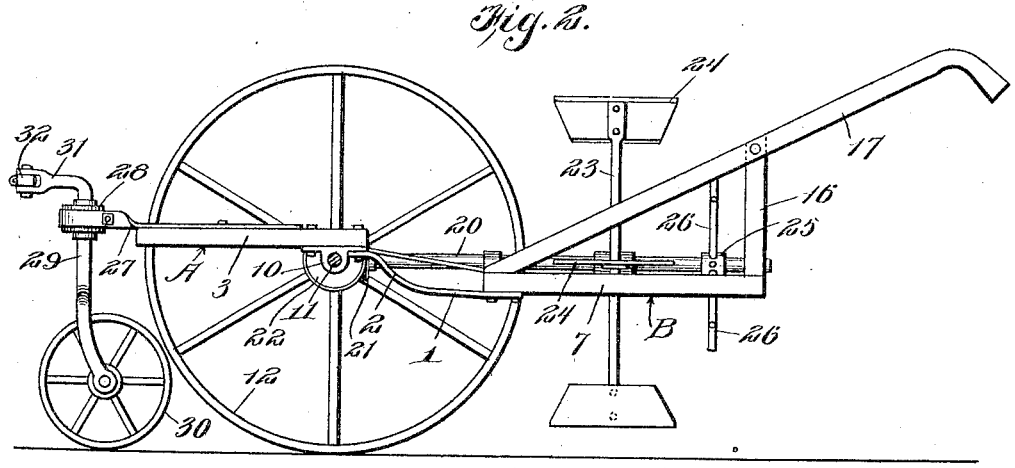

1,082,418.

Patented Dec. 23, 1913.

2 SHEETS—SHEET 2.

Witnesses
Louis R. Heinrichs

Inventor
Robert Freuler
By Victor J. Evans
Attorney

UNITED STATES PATENT OFFICE.

ROBERT FREULER, OF HALIFAX, NORTH CAROLINA.

COTTON-CHOPPER.

1,082,418.   Specification of Letters Patent.   Patented Dec. 23, 1913.

Application filed December 14, 1912, Serial No. 736,743.   Renewed October 21, 1913.   Serial No. 796,513.

*To all whom it may concern:*

Be it known that I, ROBERT FREULER, a citizen of the United States, residing at Halifax, in the county of Halifax and State of North Carolina, have invented new and useful Improvements in Cotton-Choppers, of which the following is a specification.

This invention relates to cotton choppers, and it has for its object to produce a machine which shall possess superior advantages in point of simplicity, durability and general efficiency.

With these and other ends in view which will readily appear as the nature of the invention is better understood, the same consists in the improved construction and novel arrangement and combination of parts which will be hereinafter fully described and particularly pointed out in the claims.
In the accompanying drawings has been illustrated a simple and preferred form of the invention, it being, however, understood that no limitation is necessarily made to the precise structural details therein exhibited, but that changes, alterations and modifications within the scope of the invention may be resorted to when desired.

Figure 3:
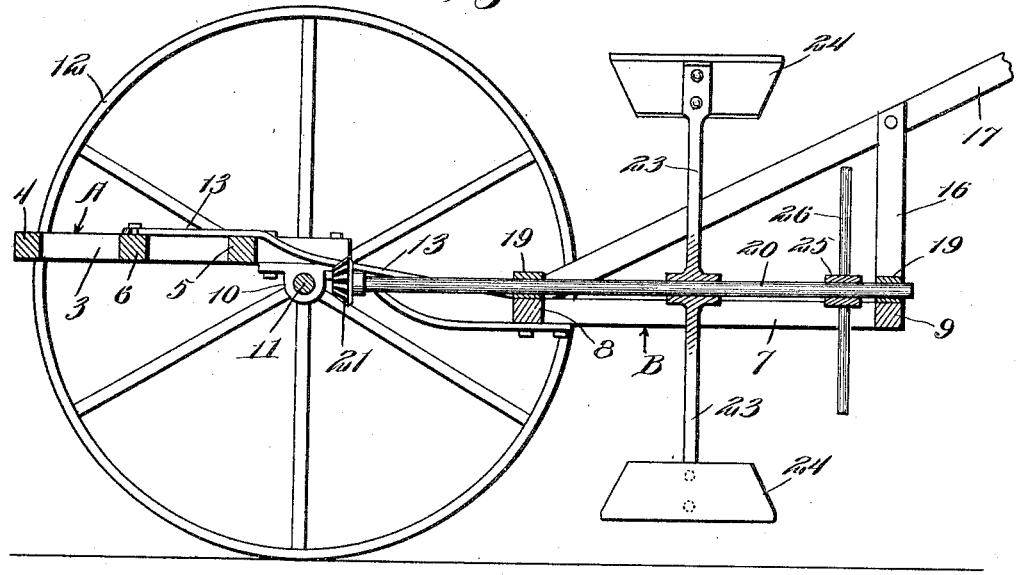
Figure 4:
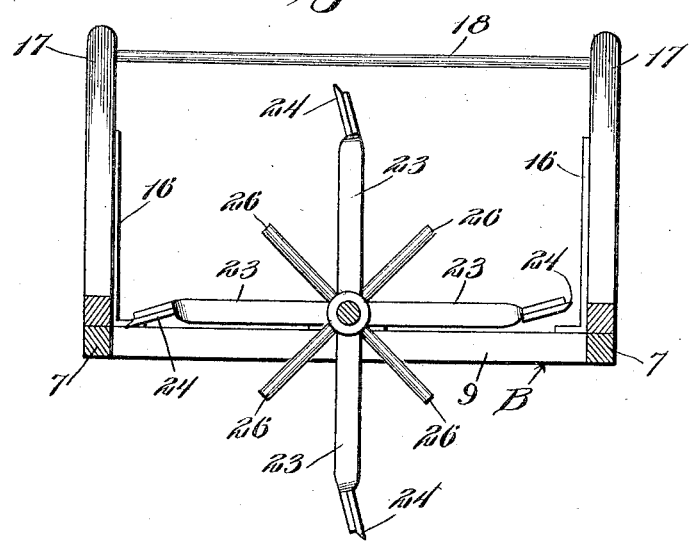

In the drawings,—Figure 1 is a top plan view of a machine constructed in accordance with the invention. Fig. 2 is a side elevation of the same. Fig. 3 is a longitudinal sectional view taken on the line 3—3 in Fig. 1. Fig. 4 is a transverse sectional view taken on the line 4—4 in Fig. 1.
Corresponding parts in the several figures are denoted by like characters of reference.

The improved cotton chopper comprises a front frame A and a rear frame B, said frames being connected together by means of flat springs 1, each having a shoulder or offset 2. The front and rear frames A and B are of substantially rectangular shape, said front frame including side members 3, 3, front and rear members 4, 5 and a cross bar 6. The rear frame B includes side members 7, 7 and front and rear members 8 and 9. The respective frames are constructed preferably of wooden bars or timbers of suitable dimensions, although angle bars of steel or other material may be employed when desired. The side members 3 of the front frame are provided with boxes or bearings 10 wherein the axle 11 is supported for rotation, said axle having transporting wheels 12. The cross bar 6 of the forward frame is connected with the front bar 9 of the rear frame by means of flexible or resilient diagonal braces 13 having terminal eyes 14 for the passage of bolts or fastening members 15.

The rear frame B is provided adjacent to the rear corners thereof with uprights 16 supporting the handles 17, the lower forward extremities of which are secured adjacent to the forward corners of said frame. The handles are connected together by means of a rung 18.

Supported for rotation in boxes or bearings 19 on the front and rear cross bars 8 and 9 of the frame B is a shaft 20 having at its forward end a bevel pinion 21 meshing with a bevel gear 22 on the axle 11. The shaft 20 is provided with radial arms or spokes 23 on which the chopping hoes 24 are suitably secured. Said shaft is also provided with a disk 25 having radially extending thinning fingers 26 serving, in conjunction with the chopping hoes, to thin the plants when the machine is in operation.

Suitably secured on the front frame A and extending forwardly thereof is a yoke 27 on which is mounted a block 28 affording a bearing for a vertical shaft 29, carrying at its lower end a guide wheel 30, said shaft being bifurcated at its lower end to accommodate said wheel. The upper end of the shaft 29 is provided with a draft hook 31 for the attachment of the draft by means of an ordinary swingletree or evener 32.

From the foregoing description, taken in connection with the drawings hereto annexed, the operation and advantages of this invention will be readily understood.

The machine which straddles the row of plants to be thinned or blocked out may be drawn by a single draft animal, hitched to the draft hook 31 and walking between the rows, the machine being guided by the operator who walks behind. The rear portion of the machine, that is to say, the frame B which supports the chopping mechanism, is supported by means of the springs 1 that extend rearwardly from the front frame A, and the rear frame may thus be conveniently gaged so as to cause the chopping hoes to operate at the desired depth. Clutch mechanism of well known construction may be employed for throwing the machine into and out of gear, but as such mechanism is well known and commonly used, it is not considered necessary to specifically illustrate the same.

Having thus described the invention, what is claimed as new, is:—

1. In a cotton chopper, a frame structure including substantially rectangular front and rear frames, a wheel carrying axle supporting the front frame, flat springs extending rearwardly from the front frame and supporting the rear frame, and a rotary chopper carrying shaft supported for rotation on the rear frame and deriving motion from the axle.

2. In a cotton chopper, a frame structure comprising substantially rectangular front and rear frames, a wheel carrying axle supporting the front frame, flat springs extending rearwardly from the side members of the front frame and secured to the side members of the rear frame which is thereby supported, handles associated with the rear frame, and a chopper carrying shaft supported for rotation on the rear frame and deriving motion from the axle.

3. In a cotton chopper, a frame structure including substantially rectangular front and rear frames and flat springs connecting the same, a wheel carrying axle supporting the front frame, a yoke supported upon and extending forwardly of the front frame, a bearing block carried by said yoke, a vertical wheel carrying shaft journaled in the bearing block and having a draft hook at its upper end, a rotary chopper carrying shaft supported on the rear frame and deriving motion from the axle, and a disk supported on the chopper carrying shaft and having radially extending thinning fingers.

In testimony whereof I affix my signature in presence of two witnesses.

ROBERT FREULER.

Witnesses:
G. A. Hux,
T. S. Dickens.

Copies of this patent may be obtained for five cents each, by addressing the "Commissioner of Patents, Washington, D. C."